United States Patent [19]

Hunt et al.

[11] Patent Number: 4,928,231

[45] Date of Patent: May 22, 1990

[54] APPARATUS FOR FORMING FLOW-MAP IMAGES USING TWO-DIMENSIONAL SPATIAL FILTERS

[75] Inventors: Barry F. Hunt, Nashua, N.H.; Alwyn P. D'Sa, Cambridge; Paul A. Magnin, Andover, both of Mass.

[73] Assignee: Hewlett-Packard Company, Palo Alto, Calif.

[21] Appl. No.: 352,602

[22] Filed: May 15, 1989

Related U.S. Application Data

[63] Continuation of Ser. No. 826,800, Mar. 6, 1986, abandoned.

[51] Int. Cl.⁵ .............................................. G06F 15/20
[52] U.S. Cl. ..................................... 364/518; 340/703; 340/729; 364/413.13; 364/521
[58] Field of Search ............................... 364/518–522, 364/413.13, 413.14, 413.15, 413.19, 413.22; 382/44, 45, 48; 340/701, 703, 723

[56] References Cited

U.S. PATENT DOCUMENTS

| | | | |
|---|---|---|---|
| 4,471,449 | 9/1984 | Leavitt et al. | 364/577 |
| 4,475,104 | 10/1984 | Shen | 340/729 |
| 4,479,192 | 10/1984 | Yamagami | 364/520 X |
| 4,545,070 | 10/1985 | Miyagawa et al. | 382/48 |
| 4,555,801 | 11/1985 | Miyagawa et al. | 382/44 |
| 4,570,181 | 2/1986 | Yamamura | 382/48 |
| 4,593,372 | 6/1986 | Bandai et al. | 364/521 |

FOREIGN PATENT DOCUMENTS

| | | |
|---|---|---|
| 0045596 | 10/1982 | European Pat. Off. . |
| 0100094 | 2/1984 | European Pat. Off. . |
| 0158920 | 10/1985 | European Pat. Off. . |
| 3321269 | 2/1984 | Fed. Rep. of Germany . |
| 2556902 | 6/1985 | France . |

OTHER PUBLICATIONS

Proceedings of Conference on Pattern Recognition and Image Processing 6/78 PS 137-141 IEEE NY VS.Narendra.

Proc. of IEEE Int. Conf. on Acoustics vol. 3 Pr. 997-1000.

A. Kundu "VLSI Implementation of Two-Dimensional Generalized Mean Filter".

Primary Examiner—Gary V. Harkcom
Assistant Examiner—H. R. Herndon
Attorney, Agent, or Firm—Frank R. Perillo

[57] ABSTRACT

The median value of data values at the intersections of each of a plurality of coordinates of one type with a plurality of coordinates of another type are respectively derived and the median of the data values thus selected is used as the display value at any of the intersections.

4 Claims, 1 Drawing Sheet

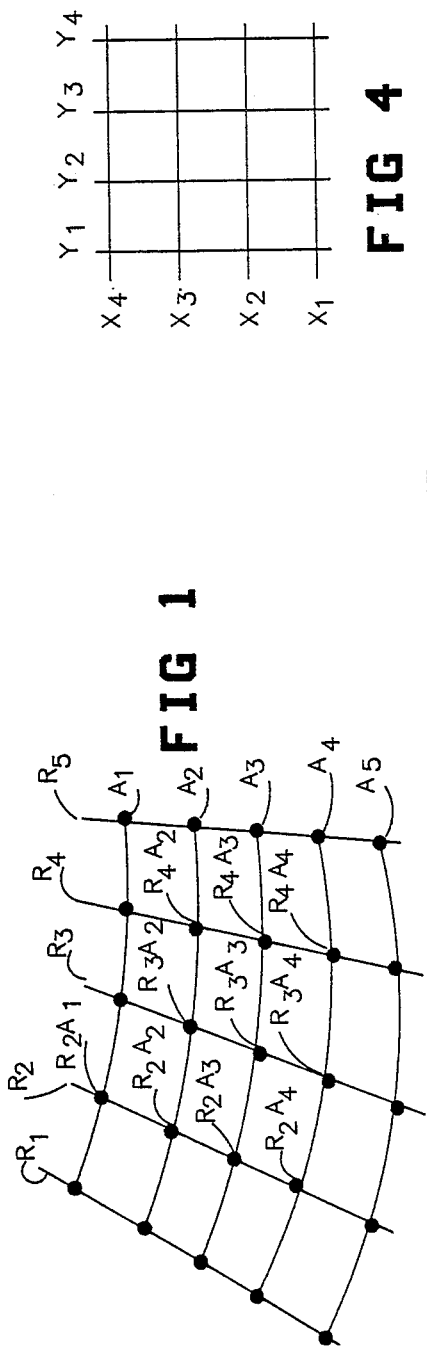
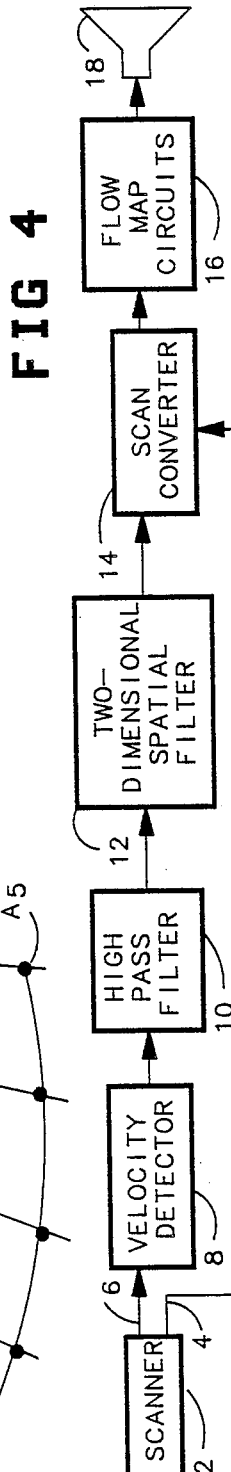
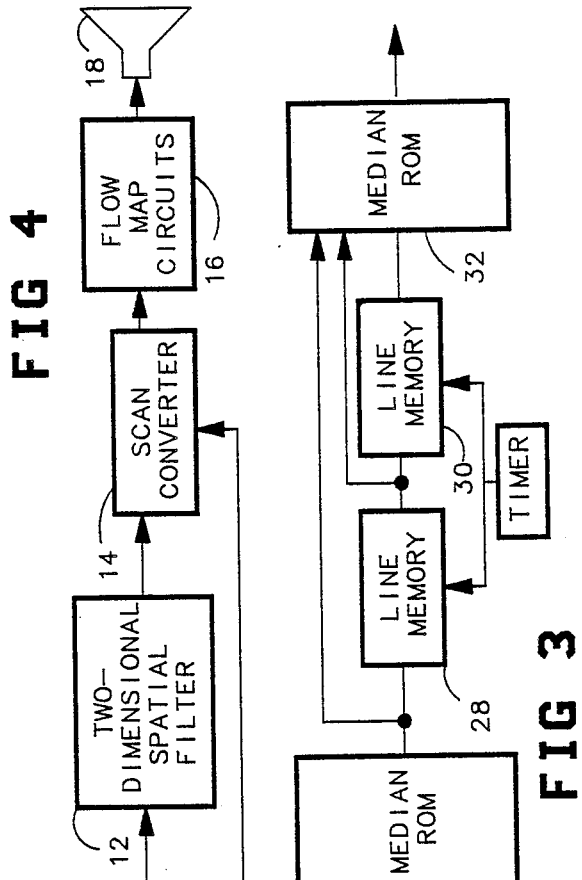
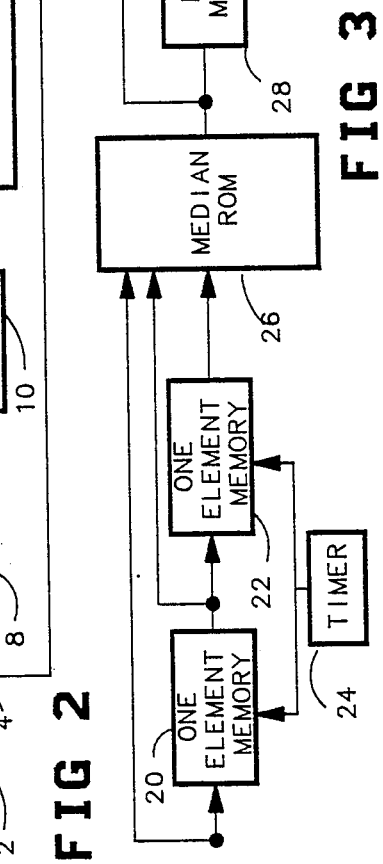

APPARATUS FOR FORMING FLOW-MAP IMAGES USING TWO-DIMENSIONAL SPATIAL FILTERS

CROSS REFERENCE TO RELATED APPLICATION

This application is a continuation of application Ser. No. 826,800, filed 3/6/86, now abandoned.

BACKGROUND OF THE INVENTION

Data values are often provided at the intersections of coordinates of one type with coordinates of another type, e.g., the intersections of radial coordinates with arc coordinates, or the intersections of x coordinates with y coordinates. If the data values are reliable, they can be used to form an image; but if they are not reliable, as where there is a low signal-to-noise ratio, where there are "drop-outs" when no data value is provided, or where there are singular or odd data values for various reasons, an image formed from these actual data values can have a very poor quality. Instead of using the raw data values at the coordinate intersections, it has been proposed that a display data value be derived for each intersection by using an arithmetic average of adjacent data values that may or may not be weighted; but this does not solve the problem because one maverick data value can have a great effect on the average.

A situation of the type referred to is encountered in the formation of two-dimensional maps of the turbulence and velocity of blood flow in the circulation system of a patient because the signal-to-noise ratio is poor and because of implementation errors of some apparatus that produces no signal at all if the signals are too weak. Furthermore, the velocity signals are really estimates derived from Doppler shift frequencies, and since they are usually sampled, aliasing may occur so that what is actually a large positive velocity can appear as a large negative velocity. Thus, if positive velocity is illustrated by one color and negative velocity by another, small areas of one color may appear in large areas of the other. As such changes in velocity are not likely to occur, the image is not a true representation of the action taking place.

BRIEF SUMMARY OF THE INVENTION

In accordance with the invention, data values located at the intersections of a plurality of coordinates of one type with coordinates of another type are used to derive a display data value to be used at an intersection near or at the middle of the intersections. This can be effected by selecting from the data values along each coordinate of one type that data value which is greater than a first given number of the data values at those intersections and less than a second given number of the data values at the intersections. Then the selected data value that is greater than a third given number of selected data values and less than a fourth given number of selected data values is chosen as the display data value. If the first and second given numbers are the same, the selected data values along the one type of coordinate are the median values; and if the third and fourth numbers are the same, the chosen selected value is the median of the selected data values.

The numbers of each coordinate need not be equal. If an odd number of each type of coordinate are used, the chosen one of the selected data values can be displayed at the intersection of the center coordinates of each type. If an odd number of a first type of coordinate and an even number of coordinates of a second type are used, the chosen one of the selected data values can be displayed at the intersections of the two innermost of the second type with the center coordinate of the first type; and if an even number of each type of coordinates is used, the chosen one of the selected data values can be displayed at any one of the four intersections of the two innermost coordinates of each type. In fact, the selected data value chosen for display can be displayed at any of the data values used in the selection process.

Practical considerations limit the numbers of coordinates that are used. If the numbers are too large, meaningful detail will be lost. Good results have been attained with three coordinates of each type.

The effect of this method of selecting data values for display is to eliminate specular "odd" values and "drop-outs". Unlike an arithmetic weighted sum, which is affected by specular values and drop-outs, the selected values of this invention completely ignore them since it always picks a value between the largest and the smallest.

BRIEF DESCRIPTION OF THE DRAWINGS

FIG. 1 illustrates the application of the invention to data samples located at the intersections of radial and angular coordinates;

FIG. 2 is a block diagram of a system incorporating this invention;

FIG. 3 is a block diagram of a two-dimensional space filter shown in FIG. 2; and FIG. 4 illustrates the application of the invention to data samples located at the intersections of rectilinear coordinates.

DETAILED DESCRIPTION OF THE INVENTION

Reference is made to FIG. 1 which illustrates a group of radial coordinates $R_1$ through $R_5$ respectively intersecting arc coordinates $A_1$ through $A_5$. In a simple application of the invention, the median of data values at intersections $R_2A_2$, $R_2A_3$ and $R_2A_4$ is selected. The same is done for the data values at the intersections $R_3A_2$, $R_3A_3$ and $R_3A_4$; and also for the data values at the intersections $R_4A_2$, $R_4A_3$ and $R_4A_4$. Thus the median value of the selected median values is used as the display data value at the central intersection $R_3A_3$.

FIG. 2 illustrates the application of this invention to ultrasound apparatus for superimposing a colored blood flow map on a monochrome image of the tissue within the body. Although not shown, a scanner 2 contains a plurality of transducers that cause a pulse of sinusoidal pressure variation to be launched into the body along each of a plurality of radial lines such as shown in FIG. 1. Sampling of the analog signal produced by the transducers in response to reflections from targets along a radial line can produce brightness values at intersections such as illustrated in FIG. 1 at an output 4. By successively launching several pulses along a radial line before launching a pulse along the next radial line, and by sampling the reflections of each pulse at appropriate times, signals from which velocity can be determined at the intersections of FIG. 1 can be made to appear at an output 6. A velocity detector 8 connected to the output 6 determines the velocity data values at successive intersections along the radial line. Thus, for each intersection along the radial line, we have a signal representing brightness and a signal representing velocity. The procedure is carried out for each radial line in succession.

In order to eliminate the components of the velocity signal supplied by the detector 8 that result from slow moving structures within the body, such as the heart wall, the velocity signal is applied to a high pass filter 10.

In accordance with this invention, the output of the high pass filter 10 is applied to a two-dimensional spatial filter 12 that is illustrated in FIG. 3. The filter 10 provides display velocity data values at the intersections along each radial line of FIG. 1 in succession.

If it is desired to form the blood velocity map and the image of the body with a rectilinear raster, a scan converter 14 is coupled to the output of the two-dimensional spatial filter 10 and the output 4 of the scanner 2. By interpolation techniques described in U.S. Pat. No. 4,471,449 issued on Sept. 11, 1984 to Steven C. Leavitt et al and entitled "Scan Conversion System", the display data values for velocity at the intersections of FIG. 1 can be converted into velocity values for the pixels of the rectilinear raster. Similarly, the brightness values at the intersections of FIG. 1 that appear at the output 4 of the scanner 2 can be converted into brightness values for the pixels of a rectilinear raster.

If it is desired to form a blood velocity map in color and superimpose it onto a monochrome image of the body structure flow map circuits 16, such as described in U.S. Pat. Application Ser. No. 748,531 that was filed on June 25, 1985 for David Lipschutz, entitled "Flow Mapping Apparatus", may be connected between the output of the scan converter 14 and a cathode ray tube 18.

Reference is now made to FIG. 3 for a description of one form of the two-dimensional spatial filter 12 of FIG. 2. The successive velocity data values at the output of the high pass filter 10 of FIG. 2 are for successive respective intersections along a radial line. They are applied to a shift register comprised of two sections 20 and 22 that are pulsed by a timer 24 at the rate at which data values occur. The input to the section 20, its output and the output of the section 22 are applied to a median ROM 26. The output of the ROM 26 is applied to the input of a shift register having two sections 28 and 30, each of which has a number of subsections equal to the number of intersections, such as shown in FIG. 1, along each radial line. The input to the section 28, its output and the output of the section 30 are applied to a second median ROM 32. The desired velocity display values for each intersection of a sector appear at the output of the median ROM 32.

The operation of the two-dimensional spatial filter of FIG. 2 that is illustrated in detail in FIG. 3 is as follows. After the first three data values are applied to the input of the section 20, they all appear at the input of the median ROM 26, which selects the median value and provides it at its output. When the fourth data value arrives, the second, third and fourth data values are applied to the median ROM 26, which selects the one having the median value and supplies it to its output. Thus, at some point, the output of the ROM 26 is the median value of data values at the intersections $R_2A_1$, $R_2A_2$ and $R_2A_3$; and when the data value at $R_2A_4$ arrives, the output of the ROM 26 is the median value of the data values at the intersections $R_2A_2$, $R_2A_3$ and $R_2A_4$. After the data values for two radial lines have been received, the median data values for each intersection of one radial line are stored in the section 28 and the median data values for the intersections of the previously scanned radial line are in the section 30. Thus, when the first median data value is received from a new line, the median data values for the first intersections will be applied to the median ROM 32. Actually meaningful data values will not be attained for the first intersections on each line, but this is unimportant.

After the raw data values have been received for $R_2$ and $R_3$ and the median data value selected for each intersection therein, and the median data value for $R_4A_2$ has been selected and placed at the output of the ROM 26, the median data values for $R_2A_2$ and $R_3A_3$ will be applied to the ROM 32 and it will select the median value of these selected median values. When the median value of $R_4A_3$ is selected and appears at the output of ROM 26, the ROM 32 selects the median value of the selected data value at $R_4A_3$, $R_3A_3$ and $R_2A_3$. Thus, the median data values are selected for intersections along the radial lines and then the median data value that is to be used for display is selected from the selected median data values of intersections along an arc. Use of different circuitry would permit the reversal of this process, i.e., the median data values could be selected for intersections on arcs and the median data value of the selected median data values along each radius could be selected for the display data value.

In the circuit of FIG. 2, nine intersections form a field of data values that can affect the display data value for each intersection; but the field could be extended in one or both directions.

In the apparatus discussed, one set of coordinates includes arcs that are related to a radius and the other set of coordinates includes radial lines that are related to angle; but any sets of coordinates could be used, such as x and y coordinates of FIG. 4. It can be seen that the intersection within the rectangular field defined by $X_4Y_1$, $X_4Y_3$, $X_2Y_1$ and $X_2Y_3$ correspond to the intersections within the field defined by $R_2A_2$, $R_2A_4$, $R_4A_2$ and $R_4A_4$ of FIG. 1.

What is claimed is:
1. Apparatus for producing images of blood flow comprising:
   a scanner having transducers for transmitting pulses of pressure waves into a body under examination along radial lines of a sector and means for sampling reflections from reflectors impinging on said transducers so as to derive signals from which the velocities of said reflectors at positions along said radial lines can be determined,
   a velocity detector for deriving from said signals data values representing the velocities of reflectors at said positions,
   a two dimensional spatial median filter coupled to said velocity detector for selecting from data values at each position and data values surrounding said position a selected data value that is to be used as the data value at said position,
   a color cathode ray tube, and
   means coupled between said two dimensional median filter and said cathode ray tube for controlling the colors it displays.

2. Apparatus as set forth in claim 1 wherein said control circuits include a scan converter.

3. Apparatus as set forth in claim 1 wherein said two dimensional median spatial filter is comprised of
   first selection means for selecting the respective median data values of groups of data values at corresponding positions along a plurality of radial lines, and second selection means for selecting the data value to be used at a position that is the median data value of the median data values of said groups.

4. Apparatus as set forth in claim 1 wherein said two dimensional median spatial filter is comprised of means for making available groups of raw data samples at positions along a given radial line and along radial lines on either side thereof that are at the same respective radial distances along said radial lines, first selection means coupled to receive said groups of raw data samples for selecting the raw data sample in each group having a value that is greater than the values of a first number of raw data samples in the group and less than the values of a second number of raw data samples in the group, and second selection means coupled to receive the raw data samples selected by said first selection means for selecting the selected raw data sample having a value greater than the values of a third number of selected raw data samples and less than the values of a fourth number of said selected raw data samples, the raw data sample selected by said second selection means being the raw data value to be used at a radial position.

* * * * *